2,745,818

SELF-REINFORCING RUBBER AND METHOD OF MAKING SAME

Theodore A. TeGrotenhuis, Olmsted Falls, Ohio, assignor of twenty per cent to The General Tire & Rubber Company, Akron, Ohio, a corporation of Ohio No Drawing. Application October 27, 1951,
Serial No. 253,560

12 Claims. (Cl. 260—45.5)

This invention is a continuation-in-part of my application Serial No. 65,968, filed December 7, 1948, which in turn is a continuation-in-part of application Serial No. 559,848, now Patent No. 2,457,097, and of application Serial No. 470,802, filed December 31, 1942, now abandoned.

The invention relates to polymeric compounds and to a method of making the same; it particularly relates to compounds comprising particles of a relatively hard or tough polymeric material in a matrix of softer polymeric material.

In the aforementioned prior applications, there is disclosed a mass of vulcanizable polymeric material, such for example as a coagulum of a latex, comprising particles of an unmasticated polymerization product polymerized or suitably crosslinked to the relatively tough or hard state, and particles of a vulcanizable comparatively plastic copolymer of a conjugated diolefinic compound of less than eight carbon atoms and a suitable mono-olefinic compound. The more plastic polymer is adapted to form a vulcanizable matrix for the less plastic particles of polymeric material upon mastication of the coagulum. As set forth in my prior applications, the differential in plasticity between the relatively tough polymeric material for the disperse phase and the relatively softer polymeric material, which is present for forming the matrix in the coagulum upon mastication, may be obtained by polymerizing the monomeric material or materials desired for the disperse phase directly to the relatively hard or tough state, and polymerizing the rubbery material desired for the matrix phase to a relatively plastic state usually with the aid of a modifying agent such for example as dodecyl mercaptan or comonomers which act as modifiers to give a more plastic polymer. The relatively tough material for the disperse phase may also be produced by non-polymerization crosslinking vulcanizing one portion of the composite latex with sulfur or vulcanizing agents. The direct polymerization to the hard or tough state may, for example, be accomplished by any of the well-known methods, by polymerizing the monomeric materials under crosslinking conditions to high yields in the absence of or with relatively small amounts of modifying agents, or by suitably selecting the copolymerizing agents to produce a harder or tough polymer, for example by increasing the quantity of the mono-olefinic copolymerizing agent relative to the diolefinic component, or by incorporating bifunctional monomers adapted to cross link excessively, etc.

While the products of the above-mentioned patent applications have many industrial uses, the products would be more desirable for some commercial applications if the effect of the disperse phase was to produce a greater hardening or stiffening action on the matrix than is sometimes present. Thus, in the case of compounds desired for the preparation of floor tile, for example, wherein the tough polymer is produced by relatively higher concentration of mono-olefinic compound, e. g. styrene, increased hardening of the entire material by the disperse phase is sometimes desirable to decrease marking tendencies. In other cases, greater compatibility or interlocking between the disperse and matrix phases may be desirable to improve flexing properties.

It is an object of the present invention to prepare compounds of the general class described in the aforementioned patent and applications in which the disperse phase tends to have a greater stiffening action per unit of volume present in the matrix, and in which the compatibility between the disperse phases is somewhat improved.

It is another object of the present invention to provide a method of making such modified polymeric compound.

In accordance with the present invention, the objects are obtained by certain step wise emulsion copolymerization of a conjugated diolefinic component such as butadiene and a mono-olefinic component such as an arylvinyl or polymerizable arylolefinic compound such as styrene and mixtures of styrene and alpha-methylstyrene, styrene and acrylonitrile, methyl methacrylate, etc. The polymerizable materials are added in at least two stages. During the early stages of the copolymerization, one of the said components constitutes a major proportion, and in the latter stages of the process the proportions are reversed so that the other of the two components i. e. that originally in minor proportion, constitutes the major proportion by weight of the monomers over the other. The quantity of polymer formed under each condition may be varied from about 10 to 90% to 90 to 10% of the total produced during both stages to obtain products desired for certain uses. The advantages of the product are more apparent when the polymerization is regulated to produce 20 to 80% of one copolymer and 80 to 20% of the other, and about equal amounts are preferred. Either the high diolefinic or the high mono-olefinic constituents of the final interpolymer may be made first.

In the first stage of the process, when the copolymer of high mono-olefinic concentration is to be produced, the prepondering polymerizable material or materials are mono-olefinic, such for example as the styrene and mixtures of butadiene copolymerizable mono-olefines, and the diolefinic constituents are present in but minor amounts relatvie to the unpolymerized mono-olefinic component present. The butadiene or diolefinic component present during the first step of the process provides compatibility with the polymer produced during the second step of the process. Even small amounts of butadiene such as 2 or 3% is noticeably effective although somewhat larger amounts such as 5 to 15% are preferred and as much as 25% of the total monomers in the reactor may be present.

In the second stage of this interpolymerization process, which is preferably started much before completing the polymerization of the monomers added during the first stage, the diolefinic component is in major proportion. The major proportion of the diolefinic component of the final polymer is incorporated into the polymerization vessel after partial polymerization of the reactants of the first stage. The amount of added diolefinic compounds depends upon the amount of free monomers, particularly the amount of free unpolymerized mono-olefinic compound of the first stage and should be so proportioned to such free mono-olefinic component that the total free diolefinic material is 60 to 95% of the weight of the combined free unpolymerized monomers. The polymerization is thereupon continued until at least 10% of the total copolymers present are formed under this condition and better until 20% or more is formed or until substantial complete polymerization of the monomers present.

When the alternate procedure is used, i. e. when the copolymer (which includes multipolymers such as terpolymers) having the high diolefinic component is formed in the early stages, the diolefin to styrene or to mono-olefin ratio at the start or early stages of the polymerization should be such that the diolefinic component (all conjugated polymerizable diolefinic compounds present) present is 60% to 95% of the total monomers. The high mono-olefinic copolymer, part of the final interpolymer, is polymerized at the latter stage with sufficient added mono-olefinic component present to make the free mono-olefinic components from 75 to 98% of the total copolymerizable free monomers and preferably from 85 to 95% of the total free monomers.

When the high diolefinic copolymer constituent of the final interpolymer is not a highly modified copolymer, i. e. when it is tough or highly crosslinked (here used synonymously) as when it is produced in the substantial absence of effective amounts of a modifier, the copolymeric constituent which is high in mono-olefinic compound residue are highly plastic soft rubbers at milling temperatures although they are a tough or hard type of soft rubbery material at normal temperatures. The product therefore is readily extruded and deformed at usual temperatures of extrusion which correspond generally to milling temperatures. If the temperature is maintained sufficiently low during mixing, the higher mono-olefinic copolymer acts as a filler and reinforcing agent also considerably improving extrudability.

When on the other hand the high diolefinic component is modified by the presence of substantial amounts of modifier during its polymerization, milling temperatures, because of the high initial plasticity and relatively small amount of work necessary, are relatively low with the result that the products are highly deformable and extrudable at room or only slightly elevated temperatures. The finely divided tough rubber serves as a reinforcing agent for the more plastic rubber. When masticated at sufficiently elevated temperatures, the two components may merge with formation of products of greater rigidity.

As previously pointed out, the mono-olefinic component may be any one of or a mixture of one or more mono-olefinic materials such as styrene, acrylonitrile, methyl methacrylate, methylvinyl ketone, methylisopropenyl ketone, vinyl pyridine, etc., which mono-olefinic materials have but one olefinic double bond but have this double bond in conjugated relation with one other (non-olefinic) double bond. Mono-olefinic materials such as vinyl chlorides, etc. which do not have conjugated double bonds are not nearly as desirable and are not sufficiently compatible. Styrene, homopolymerizable mixtures of styrenes including substituted styrenes and styrene-acrylonitrile mixtures having at least 25% of styrene are preferred for the mono-olefinic component and butadiene and isoprene and mixtures of these are preferred as the diolefinic component although chloroprene, cyanoprene, dimethylbutadiene, and mixtures of any of these diolefinic materials with less than eight aliphatic carbon atoms may be used.

The copolymerization is generally permitted to progress a substantial amount, say to at least 20 or 25% of the total possible conversion to polymers.

The polymerization is, in accordance with the present invention, accomplished in a continuous phase of inert liquids such as water containing a protective colloid and/or surface active agent such as sodium stearate, sodium oleate, lauryl sodium sulfate, and the like. Agitation is preferably used during the polymerization. A free radical initiator or catalyst such as an organic or inorganic persalt such for example as benzoyl peroxide, cumene hydroperoxide, sodium persulfate, etc. and the so-called redox catalysts, is preferably present usually in amounts of the order of a fraction of a percent to provide for initiation of polymer chains. A very small amount of a mercaptan such as lauryl mercaptan, hexadecyl mercaptan, tertiary-16-carbon-atom mercaptans, and the like may be present to help initiate the reaction in cooperation with the peroxide, such initiation being effected with amounts such as .05 to .1 percent. Larger amounts such as .3 percent to 1 percent are used in order to modify the crosslinking as evidenced by a decrease in toughness and easier processing of the copolymers produced during the presence of such mercaptan. The weight of water or inert liquid is preferably greater than the weight of the monomeric materials.

The following examples illustrate the present invention.

*Example 1*

|  | Parts |
| --- | --- |
| Butadiene | 47 |
| Styrene | 8 |
| Sodium stearate | 5 |
| MTM (tertiary mercaptan) | 0.5 |
| $K_2S_2O_8$ | 0.3 |
| Water | 180 |

The above ingredients were incorporated in an autoclave equipped for mechanical agitation, the water containing the soap and persulfate being added first. The butadiene and styrene were mixed and then incorporated with the remaining ingredients. The autoclave was maintained with agitation at a temperature of 50° C. and the ingredients permitted to polymerize for 12½ hours, at which time 82% of the monomeric materials present in the reaction were converted to the solid state. At 12½ hours after the initial polymerization was started, 44.4 parts of styrene and .05 part of MTM₄ (mixed tertiary mercaptans having an average of 16 carbon atoms) were injected into the autoclave, and the polymerization continued to a final conversion of 90% of the total monomeric materials added. The polymerization required a total time of 19¼ hours. The latex obtained from the reactor was coagulated, washed and dried and the dried coagulum was found to sheet out readily on a cold mill. It contained about 50% of bound chemically combined styrene and appeared and processed entirely differently from a 50-50 styrene-butadiene copolymer prepared by a process using but one addition of monomers.

*Example 2*

|  | Parts |
| --- | --- |
| Butadiene | 8.3 |
| Styrene | 47.2 |
| Sodium soap | 5.0 |
| MTM (tertiary mercaptans) | 0.05 |
| $K_2S_2O_8$ | 0.30 |
| Water | 180 |

The above materials were added to the autoclave in the same manner as were the materials of Example 1, and the polymerization continued by agitating the reactor as in Example 1. The temperature was maintained at 40° C. for the first 8½ hours, at 45° C. for the next 3½ hours. However, at 10 hours after the initial charge, 44.4 parts of butadiene and 0.50 part of MTM₄ (tertiary mercaptans) were injected into the reactor, i. e. they were bombed in. 12 hours after the initial charging of the reactor, the temperature was raised to 50° C. and was maintained at this temperature for 12½ hours, at which time the total polymeric solids reached 90% of the theoretical. The latex produced from the autoclave was coagulated with salt and acid using the method generally used for coagulating synthetic rubber, and the coagulum washed and dried. When it was placed on the mill, it was found to form sheets without the application of heat to the mill rolls and to be substantially the same as the product of Example 1.

*Example 3*

The styrene in Example 2 is substituted by an equal weight of a mixture of equal parts by weight of styrene and acrylonitrile, other conditions and quantities by weight being the same, except that the polymerization time is slightly less and second addition of butadiene-1,3 is made at only 75% conversion. The product produced has generally similar characteristics to those of Example 1 except for much higher resistance to swelling by oils and aromatic liquids. The product may be vulcanized as is other synthetic rubbers.

*Example 4*

The mixture incorporated in the autoclave in Example 1 is duplicated except that the laurylmercaptan is reduced to .05 part, polymerization being run to substantially the same conversion when the second addition of styrene was made. The final product is much more difficult to sheet out in a cold mill, but when temperature is raised by milling and by the addition of steam to the rolls, it immediately sheets out due to the relatively noncrosslinked high plastic nature of the high-styrene, low-butadiene rubber constitutent in the product.

In the above examples, the degree of conversion at the time of second addition and the percentages of materials added may be varied as previously explained to obtain products of varying ratios of the two types of rubbers in the polymer, namely the high-styrene-low-butadiene rubber, and of the low-styrene-high-butadiene rubber to give easily processable products of desired characteristics.

The products produced by the present invention may be added to other rubbers as processing and reinforcing aids where the finely divided harder or tougher rubber acts to improve extrudability or they may be used directly in making rubber products. When the coagulum is not subjected to high temperature mixing of the higher olefinic content rubber but where the temperature is sufficiently raised during mastication, intermingling of the two phases with formation of a harder product occurs.

It is to be understood that in accordance with the provisions of the patent statutes, variations and modifications of the specific invention herein shown and described for purposes of illustration may be made without departing from the spirit of the invention.

What I claim is:

1. A method of producing a synthetic rubber composition which comprises mixing a polymerizable conjugated diolefinic component with a copolymerizable mono-olefinic component so that one of said components constitutes a major proportion and the other a minor proportion of the weight of the mixture, dispersing the mixture in a continuous phase of water containing a surface-active agent and maintaining the mixture dispersed in the presence of a polymerization catalyst until a substantial amount of said mixture of said polymerizable components have copolymerized, thereafter mixing into the emulsion thus formed sufficient of the polymerizable component that was initially present in minor proportion to cause it to become a major proportion of the free copolymerizable components present in said mixture and agitating the mixture until a substantial amount of copolymer is formed after the second addition, the conjugated diolefinic component being 60% to 95% of the total copolymerizable components during one stage of the polymerization after one of the additions of a polymerizable component and being 2% to about 15% of the total of said polymerizable components during another stage of the polymerization after another addition of a polymerizable component the said mono-olefinic component being present in amounts of at least 5 percent of the total polymerizable ingredients during at least part of the stage when the diolefinic component is in excess and after one of the said additions of said diolefinic component, said mono-olefinic component having conjugated double bonds and said diolefinic component having less than 8 aliphatic carbon atoms.

2. The method of claim 1 wherein the resulting latex is coagulated, washed and dried.

3. A product produced by the method of claim 1.

4. The method of claim 1 wherein the diolefinic component comprises at least one diolefin as a major component and the mono-olefinic component comprises a styrene as a main ingredient thereof and where at least 5 percent of the free monomers always is styrene.

5. The method of claim 1 wherein the diolefinic component comprises at least one diolefin as a major component and the mono-olefinic component comprises a styrene and an acrylonitrile as main constituents thereof.

6. The method of claim 1 wherein the diolefinic component comprises at least one conjugated diolefin of less than 6 carbon atoms and is present in major proportion during the early part of the polymerization and wherein the polymerization is permitted to progress to at least 20% of the theoretical conversion before the addition of components to reverse proportions is had.

7. The method according to claim 1 wherein the polymerizable diolefinic compound is a diolefin and is present as a major portion of the polymerizable ingredient at the start of the polymerization reaction.

8. The method according to claim 1 wherein a styrene is present as a major component of the polymerizable ingredients at the start of the polymerization reaction and a diolefin is present as a major portion of the polymerizable materials after the said second addition.

9. A product produced by the method of claim 1 wherein the diolefinic component comprises at least one diolefin as a major component and the mono-olefinic component comprises a styrene as a main ingredient thereof and is present throughout the stage wherein the diolefin is polymerized while said diolefin is in major proportion.

10. A method according to claim 1 wherein the amount of polymer produced during the polymerization when the mono-olefin is in the major proportion is about equal to the amount of polymer produced when the diolefinic component is present in the major proportion in the polymerizable monomeric material and wherein the diolefin is principally butadiene and the mono-olefin is principally polymerizable aryl vinyl material and wherein the said aryl vinyl material is present in amounts of at least 5 percent of the polymerizable ingredients during each of said stages.

11. The method of claim 1 wherein enough of the polymerizable component that was initially present in the minor proportion is added to cause said minor component to become the major proportion of the free co-polymerizable components, thereby reversing the proportions and reversing the polymerization when the first stage is not yet completely polymerized and there is substantial free monomer present.

12. A method of producing a synthetic rubber composition which comprises mixing a polymerizable conjugated diolefinic component with a copolymerizable mono-olefinic component so that one of said components constitutes a major proportion and the other a minor proportion of the weight of the mixture, dispersing the mixture in a continuous phase of water containing a surface-active agent and maintaining the mixture dispersed in the presence of a polymerization catalyst until a substantial amount of said mixture of said polymerizable components have copolymerized, thereafter mixing into the emulsion thus formed sufficient of the polymerizable component that was initially present in minor proportion to cause it to become a major proportion of the free co-polymerizable components present in said mixture and agitating the mixture until a substantial amount of copolymer is formed after the second addition, the conjugated diolefinic component being 60% to 95% of the total copolymerizable components during one stage of the polymerization after one of the additions of a polymerizable component and being 5% to about 15% of the total of said polymerizable components during another stage of the polymerization after another addition of a polymerizable component, the said mono-olefinic component being present in amounts of at least 5% of the total polymermizable ingredients during at least part of the stage when the diolefinic component is in excess and after one of the said additions of said diolefinic component, said mono-olefinic component having conjugated double bonds and said diolefinic component having less than 8 aliphatic carbon atoms.

References Cited in the file of this patent

UNITED STATES PATENTS

| | | |
|---|---|---|
| 2,388,685 | Guss et al. | Nov. 13, 1945 |
| 2,460,300 | Le Fevre et al. | Feb. 1, 1949 |
| 2,554,268 | Rose et al. | May 22, 1951 |
| 2,623,032 | Banes et al. | Dec. 23, 1952 |